United States Patent [19]
Ono

[11] Patent Number: 5,636,322
[45] Date of Patent: Jun. 3, 1997

[54] VECTOR QUANTIZER

[75] Inventor: Shigeru Ono, Tokyo, Japan

[73] Assignee: NEC Corporation, Tokyo, Japan

[21] Appl. No.: 305,694

[22] Filed: Sep. 13, 1994

[30]  Foreign Application Priority Data

Sep. 13, 1993  [JP]  Japan ................... 5-227382

[51] Int. Cl.$^6$ ........................................... G10L 3/02
[52] U.S. Cl. .................. 395/2.31; 395/2.3; 395/2.29; 395/2.28
[58] Field of Search ................. 395/2.25–2.32; 381/34–36

[56] References Cited

U.S. PATENT DOCUMENTS

| | | | |
|---|---|---|---|
| 4,817,157 | 3/1989 | Gerson | 381/40 |
| 4,922,508 | 5/1990 | Moriya | 375/254 |
| 5,323,486 | 6/1994 | Taniguchi et al. | 395/2.31 |
| 5,396,576 | 3/1995 | Miki et al. | 395/2.31 |

FOREIGN PATENT DOCUMENTS

| | | | |
|---|---|---|---|
| 63-285599 | 11/1988 | Japan . | |
| 1-205638 | 8/1989 | Japan | G10L 3/00 |
| 2-502135 | 7/1990 | Japan | G10L 3/00 |
| 4-352200 | 12/1992 | Japan | G10L 9/18 |

OTHER PUBLICATIONS

B.H. Juang and A. H. Gray, "Multiple Stage Vector Quantization for Speech Coding", IEEE Proc. of Intl. Conf. on Acous., Speech and Signal Proc., 1982.

T. Moriya, "Two–Channel Conjugate Vector Quantizer for Noisy Channel Speech Coding", IEEE Journal on Selected Areas in Communications, vol. 10, No. 5, Jun. 1992.

J.H. Conway and N.J.A. Sloane, "Fast Quanitizing and Decoding Algorithims for Lattice Quanitzers and Codes", IEEE Trans. Inf. Theory, vol. IT–28, pp. 227–232, Mar. 1982.

R.M. Gray, "Source Coding Theory", Ch. 5.5, Kluwer Academic Publishers, 1990, pp 126–127.

I.A. Gerson and M.A. Jusiuk, "Vector Sum Excited Linear Prediction (VSELP) Speech Coding at 8 KBPS", Chicago Corp. Research and Development Center, Motorola, Inc., IEEE, 1990.

J.H. Chen, "High–Quality 16 KB/S Speech Coding with a One–Way Delay Less Than 2 MS", AT&T Bell Laboratories, IEEE, 1990.

B.S. Atal, "Predictive Coding of Speech at Low Bit Rates", IEEE Transactions on Communications, vol. Com–30, No. 4, Apr. 1982.

*Primary Examiner*—Kee M. Tung
*Attorney, Agent, or Firm*—Foley & Lardner

[57]  ABSTRACT

A vector quantizer is disclosed which performs low bit rate coding of time sequential signals such as speech signals and image signals. A basis vector set is provided consisting of basis vectors greater in number than a predetermined number of bits and correspondingly, from the basis vector set, subsets corresponding in number to at most a predetermined number of bits are formed. The subsets thus formed include those consisting of at most a single basis vector and coefficient vector subsets formed from the coefficient vector set and determined according to the formed basis vector subsets.

19 Claims, 5 Drawing Sheets

VECTOR QUANTIZER

BACKGROUND OF THE INVENTION

The present invention relates to vector quantizers for low bit rate coding of time sequential signals such as speech signals and image signals.

Vector quantization is a typical method of quantizing a speech signal or like time sequential signal by dividing the signal into frames of a predetermined interval (or blocks of a predetermined area). The vector quantization has an excellent quantization property of reducing quantization distortion for the allocated number of bits. However, it requires an extremely great number of operations to search the optimum quantization output vector best expressing the quantized signal. For example, where the frame length (or vector dimension number) is 10 and the number of bits per sample is 2, 10,485,760 times of product summing operation are required for the search. Considering a speech signal of 8 KHz sampling, this value corresponds to $830.86 \times 10^6$ times product operation per minute. This scale is far beyond the real time operation with a single chip of DSP (Digital Signal Processor) that is currently available. Accordingly, various methods have heretofore been investigated to reduce the operation scale for the vector quantization. These methods are largely grouped into a type which involves preliminary selection and/or simplification of operation, a type with specific vector quantizer structure contrivances, and a type in which the above two types are incorporated together. The type of method based on the simplification of operation has a merit that the amount of operations can be greatly reduced depending on the way of simplification. On the demerit side, however, deterioration of the properties is inevitable. It is another demerit that different evaluation standards are used at the time of the quantizer design and at the time of the search, and therefore expected quantizer properties can not be attained at the time of the design. The type of method with structural contrivance, on the other hand, has an advantage that expected quantization properties at the time of design can be attained at the time of the search. However, there is a problem that great amount of operational reduction can not be achieved unless the contrivance is well structured. The present invention pertains to the latter type method with structural contrivance.

As typical structural contrivance type method, there are multiple stage vector quantization (B. H. Juang and A. H. Gray, "Multiple Stage Vector Quantization for Speech Coding", Proc. of Intl. Conf. on Acous., Speech and Signal Proc., 1982 (Literature 1)), conjugate structure vector quantization (Moriya and Y/da, "Vector Quantization Method", Japanese Patent Laid-Open Publication No. Sho 63-285599 (Literature 2), Moriya, "Method of and Apparatus for Multiple Vector Quantization" (Lierature 3)), vector sum vector quantization (Ira A. Gerson, "Digital Speech Coder with Improved Vector Exciting Source", Japanese Patent Laid-Open Publication No. Hei 02-502135 (Literature 4)), lattice vector quantization (J. H. Conway and N.J. A. Sloane, "Fast Quantizing and Decoding Algorithms for Lattice Quantizers and Codes", IEEE Trans. Inf. Theory, Vol. IT-28, pp. 227–232, Mar. 1982 (Literature 5), R. M. Gray, "Source Coding Theory", Ch. 5.5, Kluwer Academic Publishers, 1990 (Literature 6)), and tree structure delta quantization (Taniguchi, Ohta and Kurihara, "Speech Coding System", Japanese Patent Laid-Open Publication No. Hei 4-352200 (Literature 7)). In these methods, output codevector is formed through linear operation on basis and coefficient vectors. More specifically, in the formation of output codevector for M bits from a basis vector set $\{e_i^z\}$ and a coefficient vector set $\{g_i^z\}$, selecting a basis vector subset $\{e_k^i\}$ and a coefficient vector subset $\{g_k^i\}$ the i-th output codevector $V^i$ is expressed as $$v^i = \sum_{k=1}^{K} g_k^i e_k^i \tag{1}$$

Using this formula (1), the prior art method noted above is expressed as follows. In the M-bit two stage vector quantization, the following formula is given for all $\{i,k\}$, where K=2.

$$\{g_k^i = 1, 2, i=0, \ldots, 2^M - 1\}$$

In this case, $\{e_1^i\}$ is selected from a basis vector subset $B_1$ consisting of $C_1$ vectors, and $\{e_2^i\}$ is selected from a basis vector subset $B_2$ consisting of $C_2$ vectors. Here $C_1 \times C_2 = 2^M$. In the M-bit conjugate structure vector quantization, K=2, and $$\{g_k^i = \pm 1, k=1, 2, i=0, \ldots, 2^M - 1\}.$$

In this case, $e_1^i$ is selected from the basis vector subset $B_1$ consisting of $C_1$ vectors, while $\{e_2^i\}$ is selected from the basis vector subset $B_2$ consisting of $C_2$ vectors. Here, $C_1 \times C_2 = 2^{M-2}$. In the vector sum vector quantization, under K=M and $\{g_k^i = \pm 1\}$, there are M type basis vector subsets each with single basis vector $e_k$ and the output codevector is formed through arithmetic operations of M type basis vector. In the lattice vector quantization, it is featured that K is an appropriate number $M_o$ and the coefficient vectors: $\{g_k^i, i=0, \ldots, 2^M\}$ consist of integers. There are $M_o$ type basis vector subsets each with single basis vector $e_k$. Finally, in the M-bit tree structure delta quantization, there are M type basis vector subsets each with $2^K$ vectors and coefficient vector subsets each with $\pm 1$ for each value of K which is $\{K=0,1,2, \ldots, M-1\}$, and output codevectors of $$2^M - 1 \left( = \sum_{K=0}^{M-1} 2^K \right)$$

are formed.

When the expression of the formula (1) is used, the vector quantization of the n-th input quantization vector $x_n$ is defined as a search problem for obtaining i for minimizing the following formula (2).

$$\begin{aligned}
Q_n(i) &= \|x_n - v^i\|^2 \tag{2}\\
&= \left\| x_n - \sum_{k=1}^{K} g_k^i e_k^i \right\|^2 \\
&= x_n^t x_n - 2 \sum_{k=1}^{K} x_n^t e_k^i + \sum_{k_1=1}^{K} \sum_{k_2=1}^{K} (e_{k_1}^i)^t e_{k_2}^i
\end{aligned}$$

Considering the M-bit vector quantization, in the usual vector quantization without any structural contrivance, it is necessary to perform input vector distance calculation $2^M$ times. In the case of the expression of the formula (1), it is just required to perform the K times distance calculation to the input vector, which is a smaller number of times than $2^M$, and the subsequent operation is replaced with simple arithmetic operations. Thus, it is possible to reduce the amount of operations. Further, if there are equal numbers of $v^i$ and $-v^i$ in the basis vectors, the operations concerning the inner product $(v^i)^t v^i$ are further reduced to one half. Generally, the properties and operation amount of the vector quantization depend on the number of basis vector sets. That is, the greater the number of basis vector sets, the better are the quantization properties, but the more is the operation amount.

Further, in a method in which the output codevectors are formed in the form of a linear sum of a plurality of basis vectors, such as the conjugate structure vector quantization, vector sum vector quantization, lattice structure vector quantization, etc., the characteristic deterioration due to transmission line errors is dispersed as characteristic deterioration of each basis vector. For this reason, the method is robust to errors compared with the single stage vector quantizer, in which deterioration due to transmission line error is loaded by the single vector.

Among the prior art quantization methods noted above, the multiple stage vector quantization and conjugate structure vector quantization require stage-by-stage search or preliminary selection for simply reducing the operation amount. However, this prevents the intrinsic characteristics from being attainable. The lattice vector quantization, on the other hand, permits equal characteristics to be attained at the time of the design and at the time of the search if all the basis vectors are designed collectively. However, since the number of basis vectors is at most equal to the number of bits, the quantization characteristics are inferior compared with the case without structural contrivance or the conjugate structure quantization. In the tree structure delta quantization, the number of basis vectors is less than the number of bits, and therefore the quantization characteristic is inferior compared with the cases of the conjugate vector quantization and lattice vector quantization. Besides, there has been no reported argorithm for designing an optimum quantizer for training sample sets.

SUMMARY OF THE INVENTION

An object of the present invention is therefore to provide a vector quantizing apparatus, which has a basis vector set consisting of basis vectors corresponding in number at least to a predetermined number of bits and permits a predetermined number of basis vector subsets to be obtained from the basis vector set such that some of the obtained basis vector subsets consist of a single basis vector and that output codevectors can be generated through arithmetic operations on the obtained basis vector subsets, so that it permits satisfactory quantization characteristics to be obtained with a comparatively small amount of operations and is robust to transmission line errors.

According to the present invention there is provided a vector quantizer for forming output codevectors corresponding in number to a predetermined number of bits with combinations of a set of a predetermined number of basis vectors and a set of a predetermined number of coefficient vectors, the vector quantizer comprising means for providing the basis vector sets such as to consist of basis vectors greater in number than the predetermined bit number and correspondingly forming, from the basis and coefficient vector sets, subsets corresponding in number to at most the predetermined bit number, the formed subsets including those consisting of at most a single basis vector and coefficient vector subsets formed from the coefficient vector set and determined according to the formed basis vector subsets. In the foregoing, the coefficient vector sets consist of ±1. It further comprises means for selecting combinations of a plurality of specific basis vector sets and a plurality of specific coefficient vector sets in a predetermined sequence from combinations of the formed basis vector subsets and coefficient vector subsets determined thereby, and means for forming output codevectors from combinations of the selected specific basis and coefficient vector subsets.

DESCRIPTION OF THE PREFERRED EMBODIMENTS

The present invention will now be described in conjunction with some preferred embodiments thereof.

Figure 1:
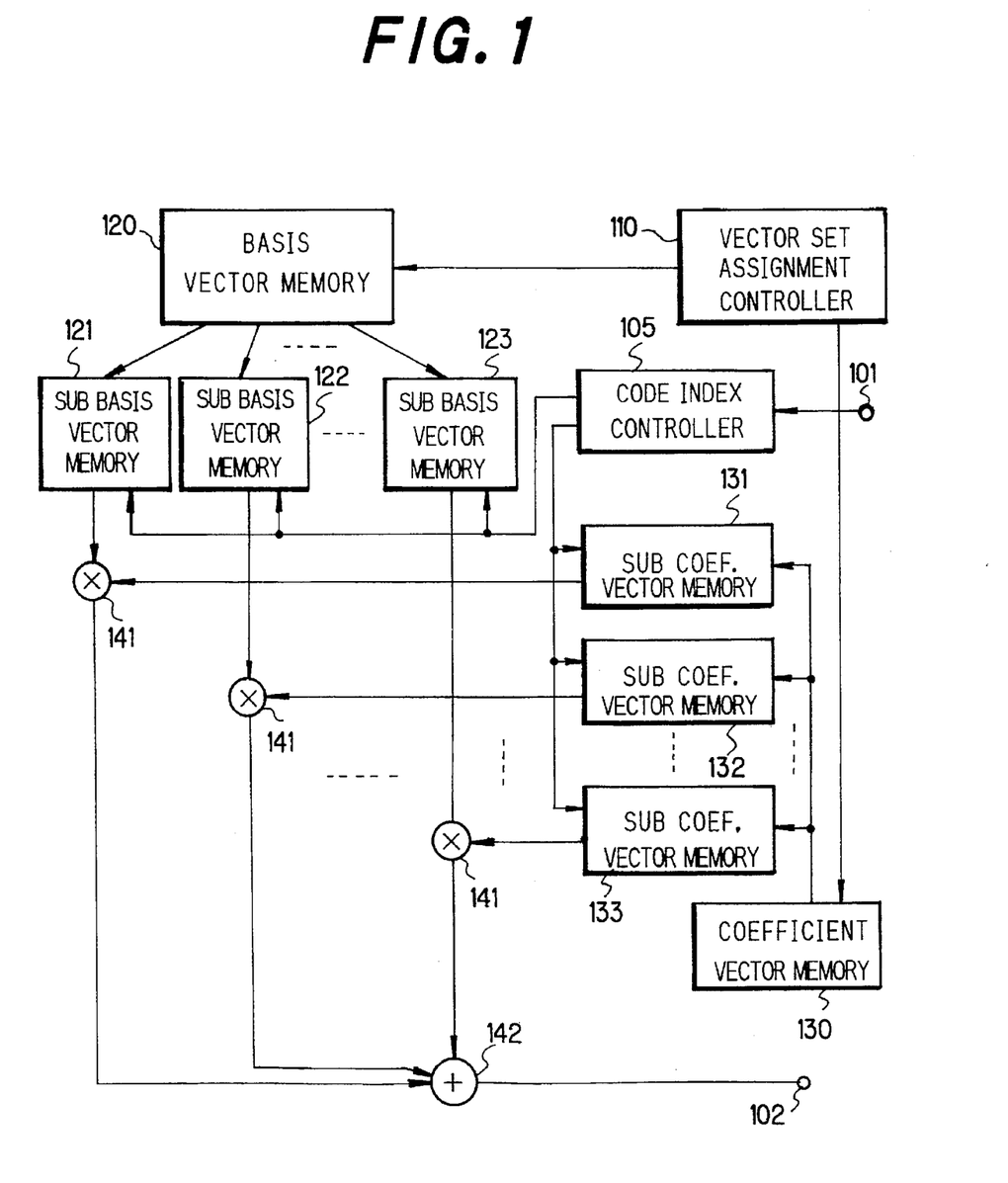
FIG. 1 is a block diagram showing a first embodiment of the vector quantizer according to the present invention.

FIG. 1 is a block diagram showing a first embodiment of the vector quantizer according to the present invention. Hereinafter, the number of bits of the quantizer is denoted by B, and the number of output codevectors by $2^B$. (The output codevector number may be less than $2^B$.) Referring to FIG. 1, a control signal input to an input terminal 101 assigns an output codevector index, and it is supplied to a code index controller 105. In a basis vector memory 120, a predetermined number of, i.e., $K_g(B<K_g<2^B)$ basis vectors are stored. In a coefficient vector memory 130, a predetermined number of, i.e., $K_c$, coefficient vectors are stored. According to information assigned from a vector set assignment controller 110, the basis vectors stored in the basis vector memory 120 are divided into M types of subsets which are each supplied to each of sub basis vector memories 121, 122, ..., 123. Meanwhile, according to information from the vector set assignment controller 110, the coefficient vectors stored in the coefficient vector memory 130 are divided into M types of ($2<M\leq B$) subsets which are each supplied to each of sub coefficient vector memories 131, 132, ..., 133. The vector set assignment controller 110 divides the basis vectors in the basis vector memory 120 such that at most one basis vector is contained in at least one of the M type sub basis vector memories, 131, 132, ..., 133.

It is assumed that the basis vectors in the m-th subsets are expressed as:

$$\{e_i^m, i=1, \ldots, K_g^M\}$$

the coefficient vectors in the m-th subset are defined as:

$$\{c_j^m, j=1, \ldots, K_c^m\}$$

The code index controller 105 generates, according to the output codevector index supplied from the input terminal 101, a control signal for selecting basis vectors and their multiplication coefficients from the sub basis and sub coefficient vector memories. The control signal is thus supplied to the sub basis vector memories 121, 122, ..., 123 and also to the sub coefficient vector memories 131, 132, ..., 133. According to the control signal from the code index controller 105, the M type sub basis and coefficient vector memories supply basis vectors $e_i^m$ and coefficients $c_j^m$ from their own subsets The basis vectors supplied from the sub basis vector memories and the coefficients output from the sub coefficient vector memories are multiplied by one another, and the products thus obtained are supplied to an adder 142. The adder 142 adds together the products of the basis vectors and the coefficients output, respectively, from the M type sub basis vector memories and the M type sub coefficient vector memories to form output codevector. The output codevector is expressed as:

$$v_t = \sum_{m=1}^{M} c_j^m e_i^m, t=1,\ldots,2^B \quad (3)$$

Output codevector $v_t$ is supplied from an output terminal 102. In this embodiment, there is a relation as shown in the following formula (4).

$$2^B = \sum_m K_g^m \times k_c^m \quad (4)$$

Figure 2:
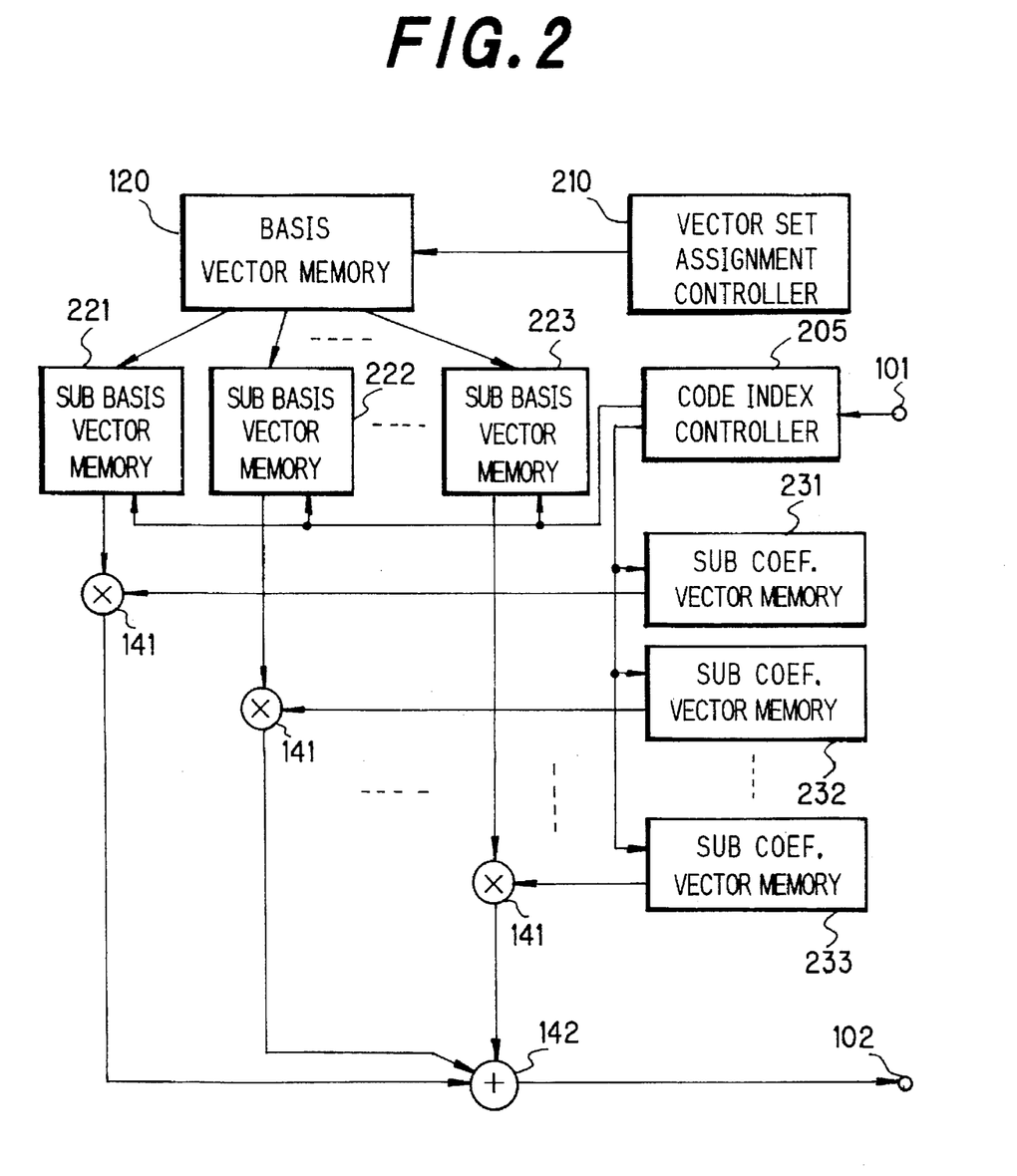
FIG. 2 is a block diagram showing a second embodiment of the vector quantizer according to the present invention.

FIG. 2 shows a second embodiment. This embodiment features that only ±1 are stored in sub coefficient vector memories 231, 232, ..., 233. According to a control signal supplied from an input terminal 101, a code index controller 205 controls the individual sub coefficient vector memories 231 to 233 to selectively provide either +1 or −1.

A vector set assignment controller 210 controls only a basis vector memory 120. For the rest, the operation is the same as in the previous first embodiment.

Figure 3:
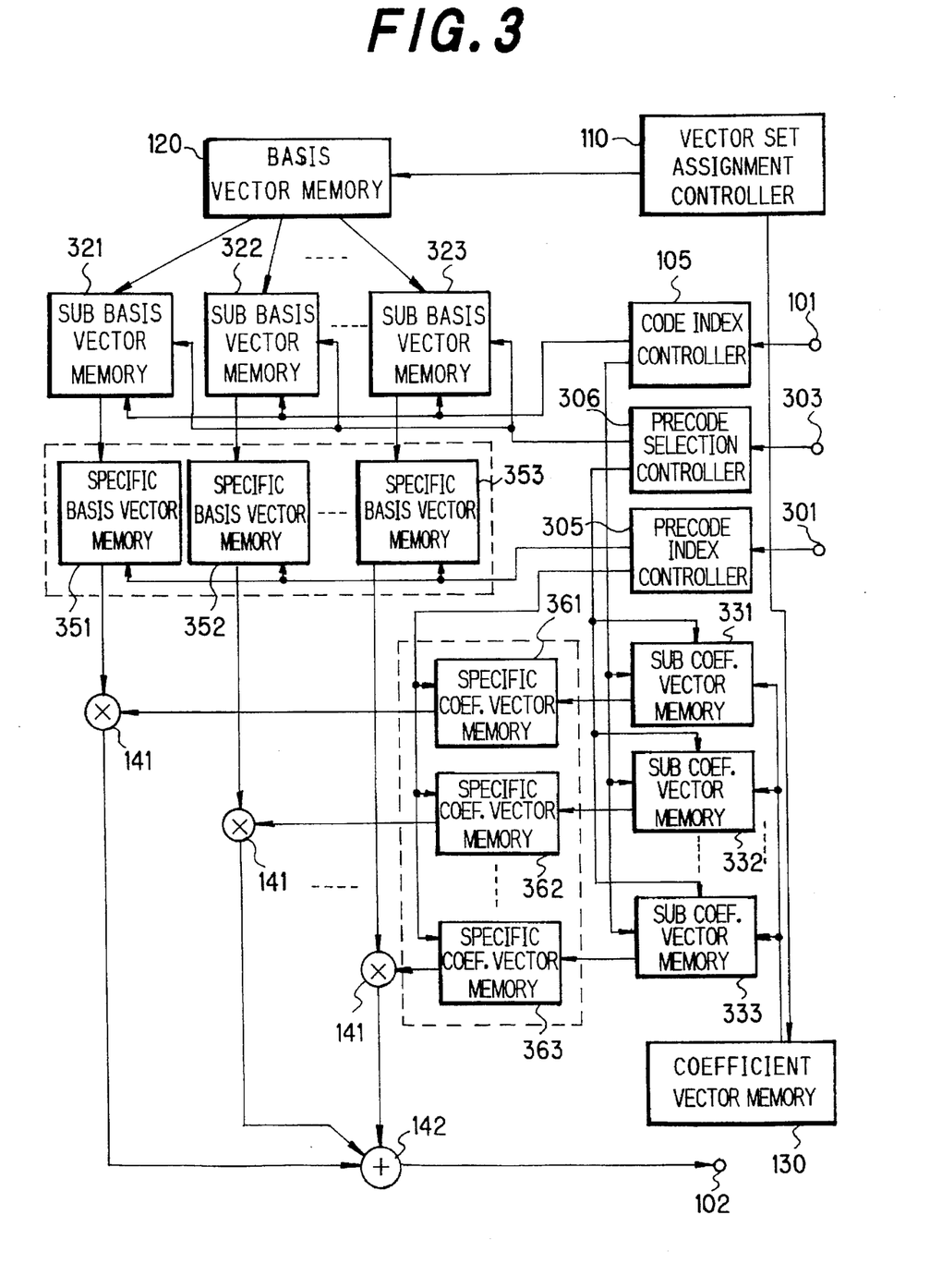
FIG. 3 is a block diagram showing a third embodiment of the vector quantizer according to the present invention.

FIG. 3 shows a third embodiment. Referring to the FIG. 3, an input terminal 101, a code index controller 105, a vector set assignment controller 110, a basis vector memory 120 and a coefficient vector memory 130 have the same functions as those described in connection with the first embodiment. According to information assigned from the vector set assignment controller 110, the basis vector memory 120 divides its stored basis vectors into M type subsets and supplies each thereof to each of sub basis vector memories 321, 322, ..., 323. Also, according to information assigned from the vector set assignment controller 110, the coefficient vector memory 130 divides its stored coefficient vectors into M type (2<M≦B) subsets and supplies each thereof to each of sub coefficient vector memories 331, 332, ..., 333. The vector set assignment controller 110 divides the basis vectors in the basis vector memory 120 such that at most one basis vector is contained in at least one of the M type sub basis vector memories 321 to 323. Further, like the first embodiment, the basis vectors in the m-th subset are expressed as: $\{e_i^m, i=1,\ldots, K_g^m\}$ and the coefficient vectors in the m-th subset are expressed as: $\{c_j^m, j=1, \ldots, K_c^m\}$ A precode selection controller 306 supplies information for selecting specific basis vectors to the sub basis vector memories 321 to 323 according to a control signal supplied from an input terminal 303. The sub basis vector memories 321 to 323 select specific basis vectors: $\{\overline{e}_i^m, i=1,\ldots, Z_g^m\}$ determined by the information supplied from the precode selection controller 306 among the basis vectors supplied from the basis vector memory 120 and supplies the selected vectors each to each corresponding one of specific basis vector memories 351, 352, ..., 353. Likewise, the sub coefficient vector memories 331 to 333 select specific coefficient vectors:

$\{\overline{c}_j^m, j=1, \ldots, Z_c^m\}$ determined by the information from the precode selection controller 306 among the coefficient vectors supplied from the coefficient vector memory 130 and supplies each of the selected vectors to each corresponding one of specific coefficient vector memories 361, 362, ..., 363. According to information supplied from an input terminal 301, a precode index controller 305 supplies a control signal for selecting basis vectors and coefficients from the specific basis vector memories 351 to 353 and specific coefficient vector memories 361 to 363. According to a control signal from the precode index controller 305, the M type specific basis and coefficient vector memories supply basis vectors $\overline{e}_i^m$ and coefficients $\overline{c}_j^m$ from their own subsets. The basis vectors and coefficients which are thus supplied are multiplied by one another in multipliers 141, and the products are supplied to an adder 142. The adder 142 adds together the products of the basis vectors and coefficients supplied from the M type specific basis vector memories and M type specific coefficient vector memories to form output codevector. The output codevector is expressed in the following formula (5).

$$v_t = \sum_{m=1}^{M} \overline{c}_j^m \overline{e}_i^m, t=1,\ldots, 2^B \quad (5)$$

Output codevector $v_t$ is supplied from an output terminal 102. Again in this embodiment, there holds a relation as shown in the following formula (6).

$$2^B = \sum_m K_g^m \times k_c^m \quad (6)$$

Figure 4:
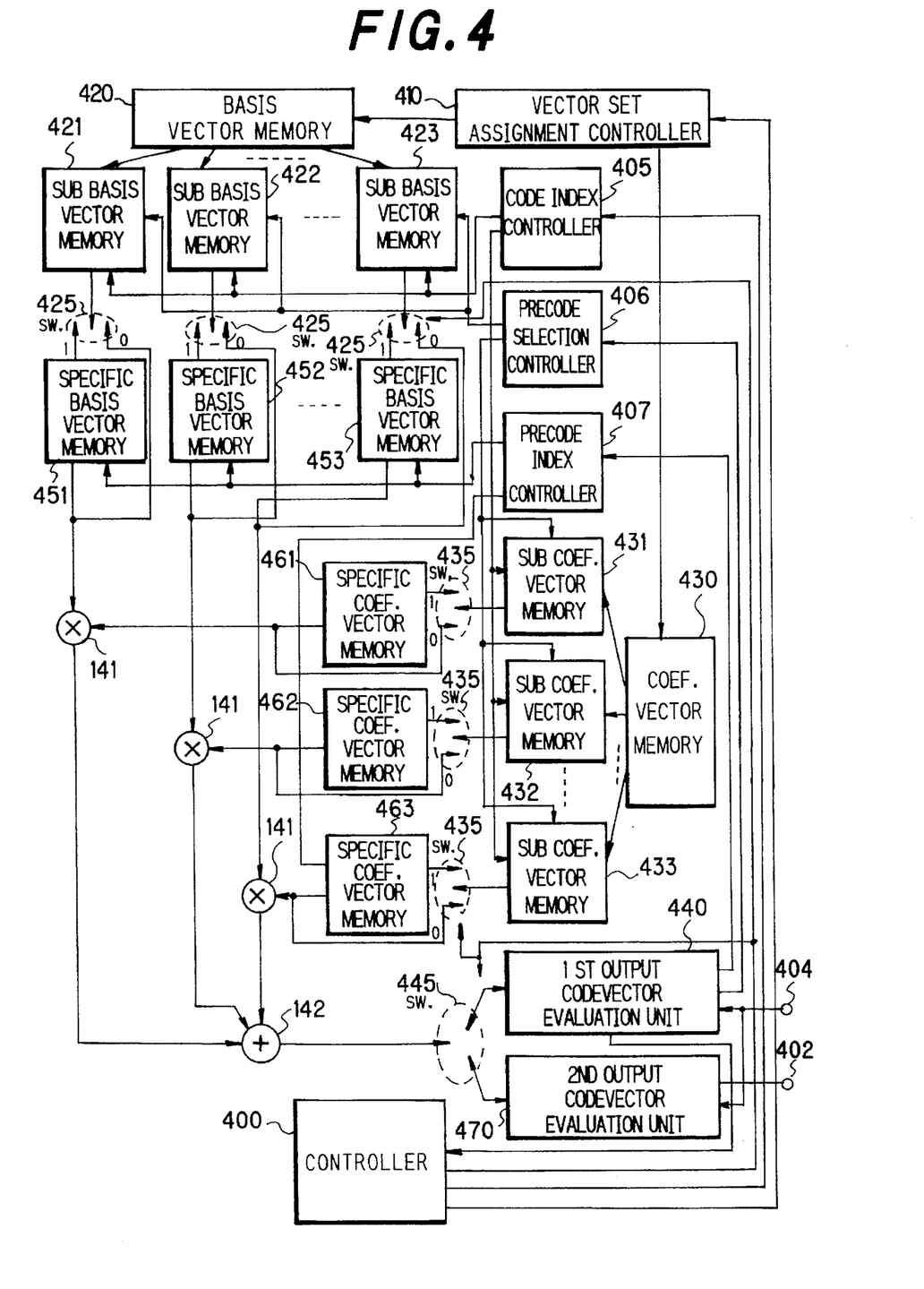
FIG. 4 is a block diagram showing a fourth embodiment of the vector quantizer according to the present invention.

FIG. 4 shows a fourth embodiment. Referring to FIG. 4, a controller 400 drives a vector set assignment controller 410 to trigger a basis vector memory 420 and a coefficient vector memory 430 for distributing basis and coefficient vectors stored in these memories to sub basis and coefficient vector memories. In the basis vector memory 420, a predetermined number of, i.e., $K_g (B < K_g < 2^B)$, basis vectors are stored. In the coefficient vector memory 430, a predetermined number of, i.e., $K_c (B < K_c < 2^B)$, coefficient vectors are stored. According to information from a vector set assignment controller 410, the basis vector memory 420 divides the stored basis vectors into M type subsets and supplies each thereof to each of sub basis vector memories 421, 422, ..., 423. Also, according to information supplied from the vector set assignment controller 410, the coefficient vector memory 430 divides the stored coefficient vectors into M type (2<M≦B) subsets and supplies each thereof to each of sub coefficient vector memories 431, 432, ..., 433. At this time, the vector set assignment controller 410 causes the division of the basis vectors in the basis vector memory 420 such that at most one basis vector is contained in at least one of the M type sub basis vector memories. The basis vectors in the subset stored in the m-th sub basis memory is defined as: $\{e_i^m i=1, \ldots, K_g^m\}$, and the coefficient vectors in the subsets stored in the m-th sub coefficient vector memory is defined as: $\{c_j^m, j=1, \ldots, K_c^m\}$.

Subsequently, the controller 400 supplies index information for assigning output codevectors corresponding to predetermined ($=2^B$) bits and a control signal for switching switches 425, 435 and 445 to zero side. According to signal supplied from the controller 400, the code index controller 405 causes information for selecting basis vectors from the individual sub basis vector memories to be supplied to the sub basis vector memories 421 to 423 and also causes information for selecting coefficients from the individual sub coefficient vector memories to be supplied to the sub coefficient vector memories 431 to 433. The sub basis vector memories 421 to 423 select basis vectors $e_i^m$ according to the information supplied from code index controller 405, the selected basis vectors being supplied through switches 425 to multipliers 141. The sub coefficient vector memories 431 to 433 select coefficients $c_j^m$ according to the information from the code index controller 405, the selected coefficients being supplied through switches 435 to the multipliers 141. In the multipliers 141, the basis vectors and coefficients supplied from the M type sub basis and coefficient vector memories are multiplied by one another, and the products thus obtained are supplied to an adder 142. The adder 142 adds together M outputs of the multipliers 141 to form output codevector. The output codevector is expressed as:

$$v_t = \sum_{m=1}^{M} c_j^m e_i^m, t=1,\ldots,2^B \qquad (7)$$

The output codevector thus formed is supplied through a switch 445 to a first output codevector evaluation unit 440. The first output codevector evaluation unit 440 calculates the inner products of an input vector x supplied from an input terminal 404 and $2^B$ (or $2^{B-1}$ if symmetrical positive and negative coefficients are present) output codevectors. The result is supplied to predetermined means for assigning a group of a predetermined number of vectors from the M type sub basis and coefficient vector sets. Information indicative of the sub vector memory of each assigned vector is supplied to a precode selection controller 406, and information indicative of the total number of assigned vectors in each sub vector memory is supplied to a precode index controller 407. As an example, an index group (F={$t_1, t_2, \ldots, t_f$}) is assigned according to the magnitudes of cross-correlation of x and $v_t$ such that $$P_t = X^t V_t, t=1,\ldots,2^B$$

This can be realized, for instance, by feeding the index group: $\{(i_{fi}^m, j_{fj}^m), m=1, \ldots, M\}$ of the sub basis and coefficient vector memories 421 to 423 and 431 to 433 generating the assigned indices to the precode selection controller 406 and outputting the number of elements:

$$\{K_{ef}^m, K_{cf}^m, m=1, \ldots, M\}$$

of the index group of the sub basis and coefficient vector memories 421 to 423 and 431 to 433 generating the assigned indices to a precode index controller 407. When information required for the precode selection and precode index controllers 406 and 407 are supplied from the first output codevector evaluation unit 440, the controller 400 supplies a control signal for switching the switches 425, 435 and 445 to the side of one. The precode selection controller 406 feed the index groups:

$$\{(i_{fi}^m, j_{fj}^m), m=1, \ldots, M\}$$

and $$e_{f_i}^{j_h}$$

from the first output codevector evaluation unit 440 to the sub basis vector memories 421 to 423 and the sub coefficient vector memories 431 to 433, respectively. Receiving information from the precode selection controller 406, the individual memories supply basis and coefficient vectors of corresponding indices to the specific basis and specific coefficient vector memories 451 to 453 and 451 to 453, respectively. The specific basis vector memories 451 to 453, receiving signal from the precode index controller 407, supplies basis vectors $$e_{f_i}^{j_h}$$

successively to multipliers 141. Also, the specific coefficient vector memories 461 to 463, receiving signal from precode index controller 407, supplies coefficients $$c_{f_j}^{j_h}$$

successively to the multipliers 141. The basis vectors and coefficients supplied to the multipliers 141 are multiplied by one another in the multipliers 141, and the products are supplied to an adder 142.

The adder 142 adds together the products of the basis vectors and coefficients from the M type specific basis vector memories and M type specific coefficient vector memories to form output codevector. The output codevector from the adder 142 is fed through the switch 455 to a second output codevector evaluation unit 470. The second codevector evaluation unit 470 calculates the distances, as shown in the following formula (8), of $t_f$ output vectors $\{v_t, t=\{t_1, t_2, \ldots, t_f\}\}$ with respect to an input vector supplied from the input terminal 404.

$$Q_t = \|x - v^t\|^2, t = \{t_1, t_2, \ldots, t_f\} \qquad (8)$$

to obtain the value of t as an index corresponding to a minimum value of $Q_t$, the value of t being output from an output terminal 402.

Figure 5:
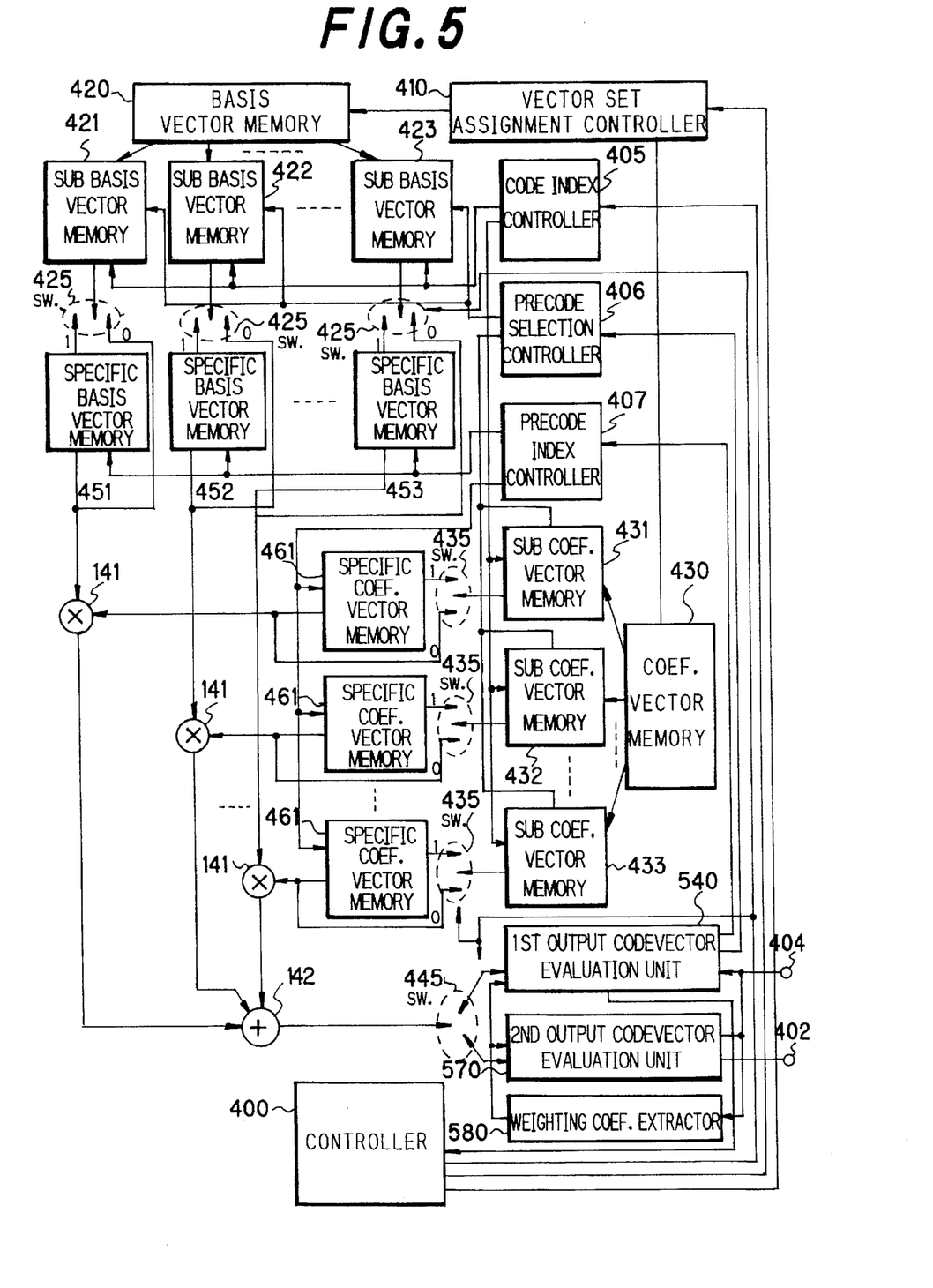
FIG. 5 is a block diagram showing a fifth embodiment of the vector quantizer according to the present invention.

FIG. 5 shows a fifth or last embodiment. This embodiment is the same in structure as the preceding fourth embodiment except for a weighting coefficient extractor 580 and a first and a second output codevector evaluation unit 540 and 570, which have structure varying with the weighting coefficient extractor 580. The weighting coefficient extractor 580 extracts weighting coefficient that is used in the first and second output codevector evaluation units 540 and 570 according to the input vector x supplied from the input terminal 404. As the weighting coefficient may be used, for instance, the auto-correlation $\{r_x(0), \ldots, r_x(K-1)\}$ where K is the dimension number of the basis and input vectors. As an alternative, it is possible to use an impulse response with respect to a perceptual weighting filter which is used as standards in speech coding. This is detailed in, for instance, B. S. Atal, "Predicative Coding of Speech at Low Bit Rates", IEEE Trans. Comm., pp. 600–614, 1982 (Literature 8), and J-H. Chen., "High-Quality 16 kb/s Speech Coding with a One-Way Delay Less Than 2 ms", Proc. of Intl. Conf. on Acous., Speech and Signal Proc., pp. 453–456, 1990 (Literature 9). Denoting the impulse response of the perceptual weighting filter by $h_w(n)$, the weighting coefficient matrix that is formed is expressed as:

$$H_x = \begin{bmatrix} h_w(0) & 0 & \ldots & 0 \\ h_w(1) & h_w(0) & \ldots & 0 \\ \cdot & \cdot & \cdot & \cdot \\ \cdot & \cdot & \cdot & \cdot \\ \cdot & \cdot & \cdot & \cdot \\ h_w(K-1) & h_w(K-2) & \ldots & h_w(0) \end{bmatrix} \qquad (9)$$

Elements $\{h_w 0 \ldots, h_w(K-1)\}$ that determine the matrix are supplied from first and second output codevector evaluation units 540 and 570. The first output codevector evaluation unit 540 calculates weighting inner products of $2^B$ (or $2_{B-1}$ if symmetrical positive and negative coefficients are present) output codevectors:

$$v_t = \sum_{m=1}^{M} c_j^m e_i^m, t=1,\ldots,2^B \qquad (10)$$

and the input vector x supplied from the input terminal 404. The result is fed to predetermined means for assigning a group of a predetermined number of vectors from the M type sub basis and coefficient vector sets. Information indicative of the index of the sub vector memory containing each assigned vector is supplied to a precode selection controller 406, and information indicative of the total number of assigned vectors in each sub vector memory is supplied to a precode index controller 407. The inner products at this time are calculated as:

$$P_t^W = (H_x x)^t H_x v_t, t=1, \ldots, 2^B \quad (11)$$

Meanwhile, a second output codevector evaluation unit 570 weighting distances of $t_f$ output vectors $\{v_t, t=\{t_1, t_2, \ldots, t_f\}\}$ supplied from an adder 142 with respect to input vector supplied from the input terminal 404.

$$Q_t^W = \|H_x(x - v^t)\|^2, t = \{t_1, t_2, \ldots, t_f\} \quad (12)$$

to obtain the value of t as an index corresponding to the minimum value of $Q_t^W$ the value of t being supplied to the output terminal 402.

In the description so far, the output codevector formation is done whenever the inner product and distance between the output codevector and input vector are calculated. However, as noted before in the description of the prior art, in the vector quantization method pertaining to the present invention it is possible to reduce the operation amount having the inner products of the input and basis vectors and the inner products of the basis vectors to be calculated previously.

As has been described in the foregoing, according to the present invention it is possible to provide a vector quantizing apparatus, which has a basis vector set consisting of basis vectors corresponding in number at least to a predetermined number of bits and permits a predetermined number of basis vector subsets to be obtained from the basis vector set such that some of the obtained basis vector subsets consist of a single basis vector and that output codevectors can be generated through arithmetic operation on the obtained basis vector subsets, so that it permits satisfactory quantization characteristics to be obtained with a comparatively small amount of operations and is robust to transmission line errors.

What is claimed is:

1. A vector quantizer for forming output codevectors corresponding in number to a predetermined number of bits with combinations of a set of a predetermined number of basis vectors and a set of a predetermined number of coefficient vectors, said vector quantizer comprising:

means for providing said basis vector set to consist of basis vectors greater in number than said predetermined bit number; and means for correspondingly forming, from said basis and coefficient vector sets, subsets corresponding in number to at most said predetermined bit number, wherein said formed subsets include subsets consisting of at most a single basis vector, and wherein said coefficient vector subsets are formed from said coefficient vector set and determined according to said formed basis vector subsets.

2. The vector quantizer according to claim 1, wherein said coefficient vector sets consist of ±1.

3. The vector quantizer according to claim 1, further comprising means for selecting combinations of a plurality of specific basis vector sets and a plurality of specific coefficient vector sets in a predetermined sequence from combinations of said formed basis vector subsets and coefficient vector subsets; and means for forming output codevectors from said selected combinations of specific basis and coefficient vector subsets.

4. A vector quantizer for forming output codevectors corresponding in number to a predetermined number of bits, comprising:

a code index controller receiving an output codevector index and generating a control signal based thereon;

a basis vector memory storing a predetermined number of basis vectors, the basis vectors being divided into a plurality of subsets in response to a vector set assignment controller;

a plurality of sub basis vector memories, each sub basis vector memory storing one of the subsets of the basis vectors and receiving the control signal from the code index controller;

a plurality of sub coefficient vector memories, each sub coefficient vector memory storing one of a plurality of subsets of coefficient vectors, each sub coefficient vector memory receiving the control signal from the code index controller;

a plurality of multipliers; and an adder, wherein, in response to the control signal, a basis vector from a subset of basis vectors of each sub basis vector memory is supplied to a corresponding one of the multipliers and a coefficient vector from a subset of coefficient vectors of each sub coefficient vector memory is supplied to a corresponding one of the multipliers, and wherein each multiplier multiplies the basis vector it receives from its corresponding sub basis vector memory by the coefficient vector it receives from its corresponding sub coefficient vector memory, the products being supplied to the adder, and wherein the adder sums the products of the multipliers to produce an output codevector.

5. A vector quantizer as recited in claim 4, further comprising a coefficient vector memory which stores a predetermined number of coefficient vectors, the coefficient vectors being divided into the plurality of subsets of coefficient vectors stored in the sub coefficient vector memories in response to the vector set assignment controller.

6. A vector quantizer as recited in claim 4, wherein the coefficient vectors stored in the sub coefficient vector memories consist of values of +1 and −1.

7. A vector quantizer as recited in claim 4, wherein the plurality of sub basis vector memories is greater in number than the predetermined number of bits.

8. A vector quantizer as recited in claim 7, wherein the subsets of the basis vectors are, in number, equal to or less than the predetermined number of bits.

9. A vector quantizer as recited in claim 8, wherein the subsets of the coefficient vectors are, in number, equal to or less than the predetermined number of bits.

10. A vector quantizer for forming output codevectors corresponding in number to a predetermined number of bits, comprising:

a code index controller receiving an output codevector index and generating a control signal based thereon;

a basis vector memory storing a predetermined number of basis vectors, the basis vectors being divided into a plurality of subsets in response to a vector set assignment controller;

a plurality of sub basis vector memories, each sub basis vector memory storing one of the subsets of the basis vectors and receiving the control signal from the code index controller;

a coefficient vector memory storing a predetermined number of coefficient vectors, the coefficient vectors being divided into a plurality of subsets in response to a vector set assignment controller;

a plurality of sub coefficient vector memories, each sub coefficient vector memory storing one of the subsets of the coefficient vectors and receiving the control signal from the code index controller;

a precode selection controller which receives an input signal and supplies precode selection signals based thereon;

a plurality of specific basis vector memories corresponding in number to the sub basic vector memories;

a plurality of specific coefficient vector memories corresponding in number to the sub coefficient vector memories;

a precode index controller providing precode index signals;

a plurality of multipliers; and an adder, wherein specific basis vectors are selected and provided to corresponding specific basis vector memories from the sub basis vector memories in response to the precode selection signals, and wherein specific coefficient vectors are selected and provided to corresponding specific coefficient vector memories from the sub coefficient vector memories in response to the precode selection signals, and wherein, in response to the precode index signals, the basis vector contained in each specific basis vector memory is provided to a corresponding one of the multipliers and the coefficient vector contained in each specific coefficient vector memory is provided to a corresponding one of the multipliers, and wherein each multiplier multiplies the basis vector it receives from its corresponding specific basis vector memory by the coefficient vector it receives from its corresponding specific coefficient vector memory, the products being provided to the adder, and wherein the adder sums the products of the multipliers to produce an output codevector.

11. A vector quantizer as recited in claim 10, wherein the plurality of sub basis vector memories is greater in number than the predetermined number of bits.

12. A vector quantizer as recited in claim 11, wherein the subsets of the basis vectors are, in number, equal to or less than the predetermined number of bits, and the subsets of the coefficient vectors are, in number, equal to or less than the predetermined number of bits.

13. A vector quantizer as recited in claim 10, further comprising:

a controller;

an output switch connected to the controller and the adder;

first and second output codevector evaluation units receiving an input vector from an input terminal;

a switched connection at an output of each sub basis vector memory having a first connection between the sub basis vector memory and the corresponding multiplier and a second connection between the sub basis vector memory and the corresponding specific basis vector memory; and a switched connection at an output of each sub coefficient vector memory having a first connection between the sub coefficient vector memory and the corresponding multiplier and a second connection between the sub coefficient vector memory and the corresponding specific coefficient vector memory, wherein the output switch has a first connection between the adder and the first output codevector evaluation unit and a second connection between the adder and the second output codevector evaluation unit, and wherein the output switch and the switched connections each make their first connection to provide a first output codevector to the first output codevector evaluation unit which calculates inner products of the input vector and the first output codevector, and wherein the output switch and the switched connection each make their second connection to provide a second output codevector to the second output codevector evaluation unit which calculates a minimum distance between the second output codevector and the input vector.

14. A vector quantizer as recited in claim 13, wherein the plurality of sub basis vector memories is greater in number than the predetermined number of bits.

15. A vector quantizer as recited in claim 14, wherein the subsets of the basis vectors are, in number, equal to or less than the predetermined number of bits, and the subsets of the coefficient vectors are, in number, equal or less than the predetermined number of bits.

16. A vector quantizer as recited in claim 13, further comprising a weighing coefficient extractor connected to the first and second output codevector evaluation units and the input terminal, wherein the weighing coefficient extractor extracts weighing coefficients for use in the first and second output codevector evaluation units in accordance with the input vector and supplies the weighing coefficients to the first and second output codevector evaluation units.

17. A vector quantizer as recited in claim 16, wherein the plurality of sub basis vector memories is greater in number than the predetermined number of bits.

18. A vector quantizer as recited in claim 17, wherein the subsets of the basis vectors are, in number, equal to or less than the predetermined number of bits, and the subsets of the coefficient vectors are, in number, equal to or less than the predetermined number of bits.

19. A vector quantizer for forming output codevectors corresponding in number to a predetermined number of bits, comprising:

a code index controller receiving an output codevector index and generating a control signal based thereon;

a basis vector memory storing a predetermined number of basis vectors;

means for dividing the basis vectors stored in the basis vector memory into a plurality of subsets;

a plurality of sub basis vector memories, each storing one of the plurality of subsets of basis vectors and receiving the control signal from the code index controller;

a plurality of sub coefficient vector memories, each storing one of a plurality of subsets of coefficient vectors, each sub coefficient vector memory receiving the control signal from the code index controller;

means for selecting a basis vector from each basis vector memory;

means for selecting a coefficient vector from each coefficient vector memory;

means for multiplying each selected basis vector by a corresponding selected coefficient vector; and means for adding the products of the multiplying means to produce an output codevector.

* * * * *